United States Patent
Wang et al.

(10) Patent No.: US 11,893,768 B2
(45) Date of Patent: Feb. 6, 2024

(54) METHOD AND SYSTEM FOR RECOGNIZING GEOMETRIC REGULARITY IMAGE OF HONEYCOMB STRUCTURE

(71) Applicant: CENTRAL SOUTH UNIVERSITY, Hunan (CN)

(72) Inventors: Zhonggang Wang, Hunan (CN); Xifeng Liang, Hunan (CN); Chong Shi, Hunan (CN); Wei Zhou, Hunan (CN); Can Cui, Hunan (CN); Wei Xiong, Hunan (CN); Xinxin Wang, Hunan (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 0 days.

(21) Appl. No.: 17/422,720

(22) PCT Filed: Aug. 18, 2020

(86) PCT No.: PCT/CN2020/109726
§ 371 (c)(1),
(2) Date: Jul. 13, 2021

(87) PCT Pub. No.: WO2021/227285
PCT Pub. Date: Nov. 18, 2021

(65) Prior Publication Data
US 2023/0214987 A1     Jul. 6, 2023

(30) Foreign Application Priority Data

May 9, 2020     (CN) .......................... 202010388353.9
May 9, 2020     (CN) .......................... 202010388489.X

(51) Int. Cl.
*G06V 10/40*     (2022.01)
*G06V 10/44*     (2022.01)
(Continued)

(52) U.S. Cl.
CPC .............. *G06V 10/40* (2022.01); *G06T 7/001* (2013.01); *G06T 7/60* (2013.01); *G06V 10/457* (2022.01);
(Continued)

(58) Field of Classification Search
CPC . G06T 7/001; G06T 7/60; G06T 2207/20036; G06V 10/40; G06V 10/457; H04N 23/695
See application file for complete search history.

(56) References Cited

PUBLICATIONS

Cui, et al. (Branch point algorithm for structural irregularity determination of honeycomb), pp. 323-330. (Year: 2019).*
(Continued)

*Primary Examiner* — Daniel G Mariam
(74) *Attorney, Agent, or Firm* — Dragon Sun Law Firm, PC; Nathaniel Perkins

(57) ABSTRACT

The present invention discloses a method and system for recognizing a geometric regularity image of a honeycomb structure. The method includes the steps of image acquisition, image processing, vertex extraction, cell reconstruction, and quality evaluation, wherein a step of binaryzation is set between the step of image processing and the step of vertex extraction, and is to set a pixel value of a background in the image to be 0 and set a pixel value of a honeycomb skeleton in the image to be 1 to form a binary image, and the step of quality evaluation is to calculate angular deviation values of all the cells and an average thereof as well as linear deviation values and an average thereof based on the reconstructed cell image, and determine whether the honeycomb structure is qualified or not by comparing with a set tolerance zone.

20 Claims, 2 Drawing Sheets

(51) Int. Cl.
    *H04N 23/695* (2023.01)
    *G06T 7/00* (2017.01)
    *G06T 7/60* (2017.01)

(52) U.S. Cl.
    CPC . *H04N 23/695* (2023.01); *G06T 2207/20036* (2013.01)

(56) References Cited

PUBLICATIONS

Wang, et al. (On the influence of structural defects for honeycomb structure), pp. 183-192. (Year: 2018).*

* cited by examiner

METHOD AND SYSTEM FOR RECOGNIZING GEOMETRIC REGULARITY IMAGE OF HONEYCOMB STRUCTURE

CROSS-REFERENCE TO RELATED APPLICATIONS

This Application is a national stage application of PCT/CN2020/109726. This application claims priorities from PCT Application No. PCT/CN2020/109726, filed Aug. 18, 2020, and from the Chinese patent application 202010388353.9 filed May 9, 2020, and from the Chinese patent application 202010388489.X, filed May 9, 2020, the content of which are incorporated herein in the entirety by reference.

TECHNICAL FIELD

The present invention relates to the fields of design, manufacture and application of lightweight structure products for transportation, machinery, aerospace equipment, ships and other equipment, and in particular to a method and a system for recognizing a geometric regularity image of a honeycomb structure.

BACKGROUND

Lightweight honeycomb products are widely applied because of their excellent carrying capacities and good energy absorption characteristics. For example, they are widely applied in high-speed trains. However, cells may be deformed easily during production, transportation and use of the honeycomb products, which significantly affects the performance of the honeycomb products. Thus, it is necessary to evaluate the cell deformation, namely, geometric regularity, of the honeycomb products, so as to judge the quality of the honeycomb products.

The Chinese patent application No. 201910503383.7 filed on Sep. 13, 2019 discloses a method for recognizing honeycomb edges from honeycomb core surface measurement data. The method includes the steps of: performing two-dimensional coordinate transformation on honeycomb core surface three-dimensional data collected, recognizing corner points in a two-dimensional plane projection image of the honeycomb core with a corner point detection algorithm, the corner points including humanoid vertexes, Y-shaped vertexes, pseudo vertexes and further including unrecognized missing corner points; sequentially recognizing two endpoints of a honeycomb edge based on a proposed corner point type judgment algorithm, one of the endpoints being determined during adjacent edge recognition, and the other endpoint being determined through local analysis of a recognized vertex, which effectively eliminates the pseudo vertexes during the recognition of the honeycomb edge, and at the same time supplements missing vertexes, realizing stable and high-precision honeycomb edge recognition. The geometric regularity of a honeycomb product can be evaluated after the honeycomb edges are recognized, and the quality of the honeycomb product can be judged accordingly. Although this method has the advantages of high precision and good robustness, it is time-consuming and cumbersome in steps as the honeycomb core surface needs to be scanned point by point.

SUMMARY

An object of the present invention is to overcome shortcomings in the prior art, and provide a method and system for recognizing a geometric regularity image of a honeycomb structure, which have high working efficiency and analysis accuracy.

The object of the present invention is achieved by the following technical solutions.

Method

A method for recognizing a geometric regularity image of a honeycomb structure, includes the steps of: image acquisition, image processing, vertex extraction, cell reconstruction, and quality evaluation, the step of image acquisition including shooting an image and reading the image by a computer; the step of vertex extraction being to find and record vertexes of cells based on the image processing; and the step of cell reconstruction being to acquire a reconstructed cell image by connecting the extracted vertexes according to a mapping relationship between the cells and the vertexes, wherein a step of binaryzation is set between the step of image processing and the step of vertex extraction, and is to set a pixel value of a background in the image to be 0 and set a pixel value of a honeycomb skeleton in the image to be 1 to form a binary image, and the step of quality evaluation is to calculate angular deviation values of all the cells and an average thereof as well as linear deviation values and an average thereof based on the reconstructed cell image, and determine whether the honeycomb structure is qualified or not by comparing with a set tolerance zone.

The step of vertex extraction includes: acquiring a smooth honeycomb vertex image by performing closed operation processing on the binary image;

acquiring an image of intersection only at honeycomb walls by sequentially expanding and corroding the smooth honeycomb vertex image; and acquiring the vertex of the honeycomb cell by taking a center of a largest circle on a honeycomb wall of the smooth honeycomb vertex image.

The step of vertex extraction is to sequentially perform wall thickness determination, pixel assignment, cell side length determination, and pixel annihilation;

the step of wall thickness determination being to set a square window whose side length is changeable from small to large, and, after a window having a certain side length traverses a morphological image, if the minimum value of the number of pixels having pixel values of 0 is non-zero, define the side length of the square window as a wall thickness L;

the step of pixel assignment being to set a square assignment window having a side length equal to the wall thickness L, traverse pixel points having pixel values of 1 in the morphological image with the assignment window, and assign a sum of the number of pixels having pixel values of 1 in the window to a pixel point at a center point of the assignment window;

the step of cell side length determination being to find a pixel point having the maximum assignment after the pixel assignment is completed, establish a square region having an initial side length E equal to the wall thickness L taking the pixel point as a center point, calculate an absolute difference Z between an assignment of each pixel point on each of four boundaries of the region and an assignment of the center point, traverse the whole morphological image, and record the minimum absolute difference Z and coordinates thereof; and establish a new square region with E=E+2 pixels, repeat the process until the minimum absolute difference Z has an obvious reverse increasing trend, and solve a honeycomb cell side length A through coordinates of a pixel point corresponding to the minimum absolute difference Z and coordinates of the center point of the region corresponding to the pixel point; and the step of pixel annihilation being to find a pixel point having the maximum assignment, determine and record the pixel point as a vertex, establish a square window to be annihilated with the honeycomb cell side length A as a side length taking the pixel point as a center, clear assignments of all pixel points having pixel values of 1 in the window to be annihilated, further find a pixel point having the maximum assignment among the remaining assignments, determine and record the pixel point as a vertex, and repeat the operation of the window to be annihilated until the assignment of the pixel point having the pixel value of 1 is less than a preset threshold and then the vertex extraction ends.

The step of vertex extraction includes firstly drawing a skeleton plot with lines having pixel values of 1 by adopting line segments having line widths of 1 pixel based on the morphological image; and secondly traversing pixel point 1 to pixel point k based on the skeleton plot with k pixel points, and when encountering a pixel point having a pixel value of 1 each time, and acquiring a number of pixel value changes by searching around eight neighborhoods of the pixel point clockwise or counterclockwise; if the number of pixel value changes is 4, displaying that two straight lines exist passing through the pixel point, and when it is known that a reasonable included angle exists between the two straight lines through coordinate calculation, determining and recording the pixel point as an edge vertex; and if the number of pixel value changes is 6, displaying that three straight lines exist passing through the pixel point, and determining and recording the pixel point as a middle vertex.

The step of vertex extraction includes firstly drawing a skeleton plot with lines having pixel values of 1 by adopting line segments having line widths of 1 pixel; secondly establishing a square window having a size of 5×5 pixels taking a pixel point having a pixel value of 1 as a center point based on the skeleton plot, and if a partial region of the window overflows the skeleton plot, assigning pixel values of all pixel points in the overflowing region to 0, calculating a corner response function value R corresponding to the center point of the window with a Harris algorithm, taking one percent of the maximum value of the corner response function value R as a limit value, and setting a corner response function value R among all corner response function values R in the same window less than the limit value to 0, and repeating the operations to traverse the whole skeleton plot; and thirdly establishing a square window having a size of 3×3 pixels taking a pixel point having a pixel value of 1 and a corner response function value R greater than 0 as a center point, and if the R value of the center point of the window is the maximum value in the window, recording the center point as a vertex, and repeating the operations to traverse the whole skeleton plot.

The step of cell reconstruction includes: firstly arbitrarily selecting x vertexes at the central position of the binary image as reference points, finding a vertex closest to each of the reference points as an adjacent point, calculating a distance between the reference point and the adjacent point, keeping three shortest distance records, and solving an average of distances of 3× records as the cell side length A; secondly classifying the acquired vertexes into active connection points and passive connection points, that is, dividing the skeleton plot into two regions, namely, an edge region at the periphery of the skeleton plot and having a width of 1 A-2 A, and a central region surrounded by the edge region, the vertexes located in the central region being the active connection points, and the vertexes located in the edge region being the passive connection points; and thirdly connecting all the active connection points to the closest three vertexes with line segments, that is, each active connection point essentially and only keeping three shortest line segments, and the reconstructed cell image being formed after the connection is completed.

The step of cell reconstruction includes edge expansion and vertex connection, the step of edge expansion including forming an expanded region by expanding the outermost edge of each of four sides of the morphological image outward by a width of at least 1 pixel based on the morphological image, and acquiring an expanded image by setting pixel values of all pixel points in the expanded region to 1; the step of vertex connection includes traversing the expanded image in an order from left to right and from top to bottom taking the expanded image as an object, and when encountering a pixel point having a pixel value of 0, finding and recording a vertex of the same cell and a connection sequence thereof with a Moore neighborhood tracking algorithm and recording the same under the cell, deleting duplicate records on a principle that each cell keeps at most six vertexes, and drawing a complete cell by connecting the vertexes according to the kept records; then, setting pixel values of all pixel points in the cell to 1; and finding a next pixel having a pixel value of 1 and repeating the operations until the traverse is completed and the reconstructed cell image is also completed.

A system applicable to the method for recognizing a geometric regularity image of a honeycomb structure includes a detection stage, a digital camera and a computer, the digital camera being electrically connected to the computer;

the number of the digital camera is at least one with a resolution no less than 1080 P, equipped with a telecentric lens, and fixedly mounted and/or movably mounted;

the detection stage is a movable working platform, and includes a placement stage, a lifting device and a clamp; the lifting device is mounted at the bottom of the placement stage; a honeycomb part to be detected is placed on the placement stage; the lifting device includes vertical guide rails and an electric or electro-hydraulic push rod, and is capable of pushing the placement stage to move vertically along the vertical guide rails to adjust a height of the honeycomb part to be detected, so as to ensure that an upper face of the honeycomb part to be detected is flush with an upper face of the clamp; and a control part of the lifting device is electrically connected to the computer; and the clamp is composed of four flat plates and a drive device, is capable of moving close to the honeycomb part to be detected under the action of the drive device, and is then locked by the honeycomb part to be detected, so as to locate and fix the honeycomb part to be detected.

In the case where the digital camera is movably mounted, the system is additionally provided with a walking gantry, sliding rails and a moving device;

the digital camera is mounted on a beam of the walking gantry, and capable of moving laterally along the beam under the drive of the moving devices; and the walking gantry is capable of moving longitudinally along the sliding rails under the drive of the moving devices. Movements of both the digital camera and the walking gantry are controlled by the computer.

The computer includes:

a vertex extraction module, configured to find and record vertexes of cells;

a cell reconstruction module, configured to acquire a reconstructed cell image by connecting the extracted vertexes according to a mapping relationship between the cells and the vertexes; and a quality evaluation module, configured to calculate angular deviation values of all the cells and an average thereof as well as linear deviation values and an average thereof based on the reconstructed cell image, and determine whether the honeycomb structure is qualified or not by comparing with a set tolerance zone.

The computer further includes:

a binarization module, configured to set a pixel value of a background in an image to be 0 and set a pixel value of a honeycomb skeleton in the image to be 1 to form a binary image.

The vertex extraction module includes:

a wall thickness determination unit, configured to set a square window whose side length is changeable from small to large, and, after a window having a certain side length traverses a morphological image, if the minimum value of the number of pixels having pixel values of 0 is non-zero, define the side length of the square window as a wall thickness L;

a pixel assignment unit, configured to set a square assignment window having a side length equal to the wall thickness L, traverse pixel points having pixel values of 1 in the morphological image with the assignment window, and assign a sum of the number of pixels having pixel values of 1 in the window to a pixel point at a center point of the assignment window;

a cell side length unit determination unit, configured to find a pixel point having the maximum assignment after the pixel assignment is completed, establish a square region having an initial side length E equal to the wall thickness L taking the pixel point as a center point, calculate an absolute difference Z between an assignment of each pixel point on each of four boundaries of the region and an assignment of the center point, traverse the whole morphological image, and record the minimum absolute difference Z and coordinates thereof; and establish a new square region with E=E+2 pixels, repeat the process until the minimum absolute difference Z has an obvious reverse increasing trend, and solve a honeycomb cell side length A through coordinates of a pixel point corresponding to the minimum absolute difference Z and coordinates of the center point of the region corresponding to the pixel point; and a pixel annihilation unit, configured to find a pixel point having the maximum assignment, determine and record the pixel point as a vertex, establish a square window to be annihilated with the honeycomb cell side length A as a side length taking the pixel point as a center, clear assignments of all pixel points having pixel values of 1 in the window to be annihilated, further find a pixel point having the maximum assignment among the remaining assignments, determine and record the pixel point as a vertex, and repeat the operation of the window to be annihilated until the assignment of the pixel point having the pixel value of 1 is less than a preset threshold and then the vertex extraction ends.

The vertex extraction module is specifically configured to firstly draw a skeleton plot with lines having pixel values of 1 by adopting line segments having line widths of 1 pixel based on the morphological image; and secondly traverse pixel point 1 to pixel point k based on the skeleton plot with k pixel points, and when encountering a pixel point having a pixel value of 1 each time, acquire a number of pixel value changes by searching around eight neighborhoods of the pixel point clockwise or counterclockwise; if the number of pixel value changes is 4, display that two straight lines exist passing through the pixel point, and when it is known that a reasonable included angle exists between the two straight lines through coordinate calculation, determine and record the pixel point as an edge vertex; and if the number of pixel value changes is 6, display that three straight lines exist passing through the pixel point, and determine and record the pixel point as a middle vertex.

The vertex extraction module is specifically configured to firstly draw a skeleton plot with lines having pixel values of 1 by adopting line segments having line widths of 1 pixel; secondly establish a square window having a size of 5×5 pixels taking a pixel point having a pixel value of 1 as a center point based on the skeleton plot, and if a partial region of the window overflows the skeleton plot, assign pixel values of all pixel points in the overflowing region to 0, calculate a corner response function value R corresponding to the center point of the window with a Harris algorithm, take one percent of the maximum value of the corner response function value R as a limit value, and set a corner response function value R among all corner response function values R in the same window less than the limit value to 0, and repeat the operations to traverse the whole skeleton plot; and thirdly establish a square window having a size of 3×3 pixels taking a pixel point having a pixel value of 1 and a corner response function value R greater than 0 as a center point, and if the R value of the center point of the window is the maximum value in the window, record the center point as a vertex, and repeat the operations to traverse the whole skeleton plot.

The cell reconstruction module is specifically configured to firstly arbitrarily select x vertexes at the central position of the binary image as reference points, find a vertex closest to each of the reference points as an adjacent point, calculate a distance between the reference point and the adjacent point, keep three shortest distance records, and solve an average of distances of 3× records as the cell side length A; secondly classify the acquired vertexes into active connection points and passive connection points, that is, divide the skeleton plot into two regions, namely, an edge region at the periphery of the skeleton plot and having a width of 1 A-2 A, and a central region surrounded by the edge region, the vertexes located in the central region being the active connection points, and the vertexes located in the edge region being the passive connection points; and thirdly connect all the active connection points to the closest three vertexes with line segments, that is, each active connection point essentially and only keeping three shortest line segments, and the reconstructed cell image being formed after the connection is completed.

The cell reconstruction module includes:

an edge expansion unit, configured to form an expanded region by expanding the outermost edge of each of four sides of the morphological image outward by a width of at least 1 pixel based on the morphological image, and acquire an expanded image by setting pixel values of all pixel points in the expanded region to 1; and a vertex connection unit, configured to traverse the expanded image in an order from left to right and from top to bottom taking the expanded image as an object, and when encountering a pixel point having a pixel value of 0, find and record a vertex of the same cell and a connection sequence thereof with a Moore neighborhood tracking algorithm and recording the same under the cell, delete duplicate records on a principle that each cell keeps at most six vertexes, and draw a complete cell by connecting the vertexes according to the kept records; then, set pixel values of all pixel points in the cell to 1; and find a next pixel having a pixel value of 1 and repeat the operations until the traverse is completed and the reconstructed cell image is also completed.

A storage medium storing a computer program therein is provided. The computer program, when executed by a processor, causes the processor to execute the steps of the method according to any one of the above technical solutions.

An electronic device is provided, including a memory, a display, a processor, and a computer program stored in the memory and running on the processor. The computer program, when executed by the processor, causes the processor to execute the steps of the method according to any one of the above technical solutions.

Compared with the prior art, the method and the system according to the present invention have advantages of being scientific, reasonable, simple, feasible, high in detection precision and working efficiency, and the like.

Figure 1:
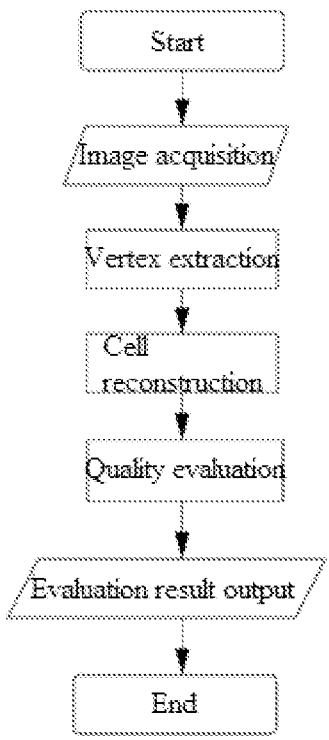
FIG. 1 is a flowchart of a method according to the present invention.

In the drawings: 1-detection stage, 2-digital camera, 3-computer, 4-placement stage, 5-lifting device, 6-clamp, 7-walking gantry, 8-sliding rails, and 9-moving device.

DETAILED DESCRIPTION

The present invention will be further described below with reference to the accompanying drawings and embodiments.

Figure 2:
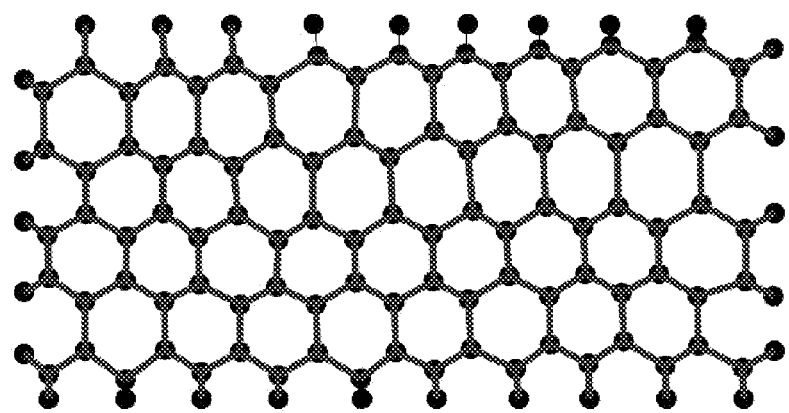
FIG. 2 is a schematic diagram of vertex extraction and cell reconstruction in a method according to an embodiment of the present invention.

Method. Refer to FIGS. 1 and 2.

A method for recognizing a geometric regularity image of a honeycomb structure, includes the steps of: image acquisition, image processing, vertex extraction, cell reconstruction, and quality evaluation, the step of image acquisition including shooting an image and reading the image by a computer; the step of vertex extraction being to find and record vertexes of cells based on the image processing; and the step of cell reconstruction being to acquire a reconstructed cell image by connecting the extracted vertexes according to a mapping relationship between the cells and the vertexes, wherein a step of binaryzation is set between the step of image processing and the step of vertex extraction, and is to set a pixel value of a background in the image to be 0 and set a pixel value of a honeycomb skeleton in the image to be 1 to form a binary image, and the step of quality evaluation is to calculate angular deviation values of all the cells and an average thereof as well as linear deviation values and an average thereof based on the reconstructed cell image, and determine whether the honeycomb structure is qualified or not by comparing with a set tolerance zone.

The step of vertex extraction includes: acquiring a smooth honeycomb vertex image by performing closed operation processing on the binary image;

acquiring an image of intersection only at honeycomb walls by sequentially expanding and corroding the smooth honeycomb vertex image; and acquiring the vertex of the honeycomb cell by taking a center of a largest circle on a honeycomb wall of the smooth honeycomb vertex image.

The step of vertex extraction is to sequentially perform wall thickness determination, pixel assignment, cell side length determination, and pixel annihilation;

the step of wall thickness determination being to set a square window whose side length is changeable from small to large, and, after a window having a certain side length traverses a morphological image, if the minimum value of the number of pixels having pixel values of 0 is non-zero, define the side length of the square window as a wall thickness L;

the step of pixel assignment being to set a square assignment window having a side length equal to the wall thickness L, traverse pixel points having pixel values of 1 in the morphological image with the assignment window, and assign a sum of the number of pixels having pixel values of 1 in the window to a pixel point at a center point of the assignment window;

the step of cell side length determination being to find a pixel point having the maximum assignment after the pixel assignment is completed, establish a square region having an initial side length E equal to the wall thickness L taking the pixel point as a center point, calculate an absolute difference Z between an assignment of each pixel point on each of four boundaries of the region and an assignment of the center point, traverse the whole morphological image, and record the minimum absolute difference Z and coordinates thereof; and establish a new square region with E=E+2 pixels, repeat the process until the minimum absolute difference Z has an obvious reverse increasing trend, and solve a honeycomb cell side length A through coordinates of a pixel point corresponding to the minimum absolute difference Z and coordinates of the center point of the region corresponding to the pixel point; and the step of pixel annihilation being to find a pixel point having the maximum assignment, determine and record the pixel point as a vertex, establish a square window to be annihilated with the honeycomb cell side length A as a side length taking the pixel point as a center, clear assignments of all pixel points having pixel values of 1 in the window to be annihilated, further find a pixel point having the maximum assignment among the remaining assignments, determine and record the pixel point as a vertex, and repeat the operation of the window to be annihilated until the assignment of the pixel point having the pixel value of 1 is less than a preset threshold and then the vertex extraction ends.

The step of vertex extraction includes firstly drawing a skeleton plot with lines having pixel values of 1 by adopting line segments having line widths of 1 pixel based on the morphological image; and secondly traversing pixel point 1 to pixel point k based on the skeleton plot with k pixel points, and when encountering a pixel point having a pixel value of 1 each time, and acquiring a number of pixel value changes by searching around eight neighborhoods of the pixel point clockwise or counterclockwise; if the number of pixel value changes is 4, displaying that two straight lines exist passing through the pixel point, and when it is known that a reasonable included angle exists between the two straight lines through coordinate calculation, determining and recording the pixel point as an edge vertex; and if the number of pixel value changes is 6, displaying that three straight lines exist passing through the pixel point, and determining and recording the pixel point as a middle vertex.

The step of vertex extraction includes firstly drawing a skeleton plot with lines having pixel values of 1 by adopting line segments having line widths of 1 pixel; secondly establishing a square window having a size of 5×5 pixels taking a pixel point having a pixel value of 1 as a center point based on the skeleton plot, and if a partial region of the window overflows the skeleton plot, assigning pixel values of all pixel points in the overflowing region to 0, calculating a corner response function value R corresponding to the center point of the window with a Harris algorithm, taking one percent of the maximum value of the corner response function value R as a limit value, and setting a corner response function value R among all corner response function values R in the same window less than the limit value to 0, and repeating the operations to traverse the whole skeleton plot; and thirdly establishing a square window having a size of 3×3 pixels taking a pixel point having a pixel value of 1 and a corner response function value R greater than 0 as a center point, and if the R value of the center point of the window is the maximum value in the window, recording the center point as a vertex, and repeating the operations to traverse the whole skeleton plot.

The step of cell reconstruction includes firstly arbitrarily selecting x vertexes at the central position of the binary image as reference points, finding a vertex closest to each of the reference points as an adjacent point, calculating a distance between the reference point and the adjacent point, keeping three shortest distance records, and solving an average of distances of 3× records as the cell side length A; secondly classifying the acquired vertexes into active connection points and passive connection points, that is, dividing the skeleton plot into two regions, namely, an edge region at the periphery of the skeleton plot and having a width of 1 A-2 A, and a central region surrounded by the edge region, the vertexes located in the central region being the active connection points, and the vertexes located in the edge region being the passive connection points; and thirdly connecting all the active connection points to the closest three vertexes with line segments, that is, each active connection point essentially and only keeping three shortest line segments, and the reconstructed cell image being formed after the connection is completed.

The step of cell reconstruction includes edge expansion and vertex connection, the step of edge expansion including forming an expanded region by expanding the outermost edge of each of four sides of the morphological image outward by a width of at least 1 pixel based on the morphological image, and acquiring an expanded image by setting pixel values of all pixel points in the expanded region to 1; the step of vertex connection including traversing the expanded image in an order from left to right and from top to bottom taking the expanded image as an object, and when encountering a pixel point having a pixel value of 0, finding and recording a vertex of the same cell and a connection sequence thereof with a Moore neighborhood tracking algorithm and recording the same under the cell, deleting duplicate records on a principle that each cell keeps at most six vertexes, and drawing a complete cell by connecting the vertexes according to the kept records; then, setting pixel values of all pixel points in the cell to 1; and finding a next pixel having a pixel value of 1 and repeating the operations until the traverse is completed and the reconstructed cell image is also completed.

Figure 3:
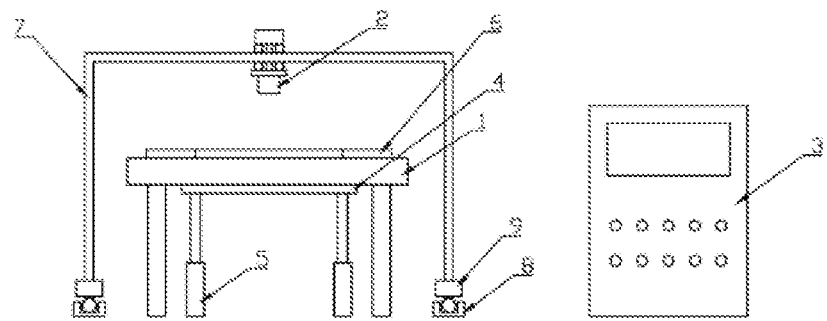
FIG. 3 is a schematic diagram of device configuration in a system according to an embodiment of the present invention.
Figure 4:
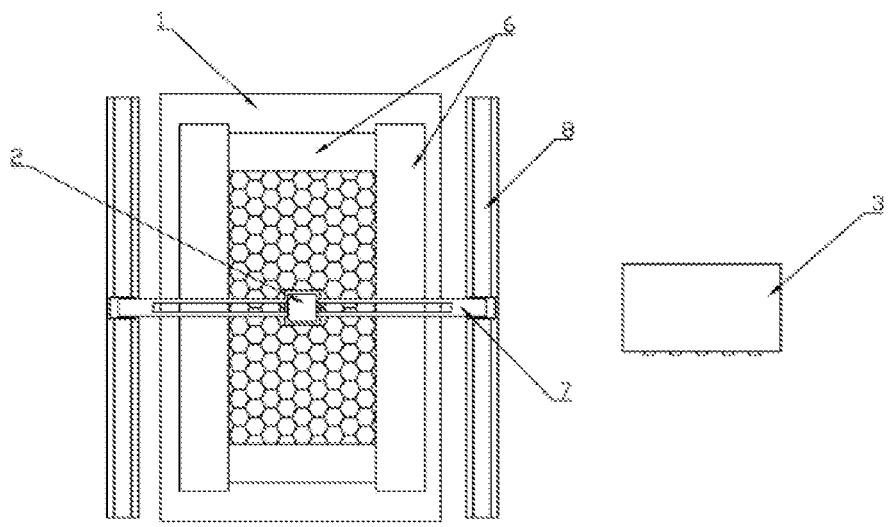
FIG. 4 is a top view of FIG. 3.

System. Refer to FIGS. 3 and 4.

A system applicable to the method for recognizing a geometric regularity image of a honeycomb structure includes a detection stage 1, a digital camera 2 and a computer 3, the digital camera 2 being electrically connected to the computer 3;

the number of the digital camera 2 is at least one with a resolution no less than 1080 P, equipped with a telecentric lens, and fixedly mounted and/or movably mounted;

the detection stage 1 is a movable working platform, and includes a placement stage 4, a lifting device 5 and a clamp 6; the lifting device 5 is mounted at the bottom of the placement stage 4; a honeycomb part to be detected is placed on the placement stage 4; the lifting device 5 includes vertical guide rails and an electric or electro-hydraulic push rod, and is capable of pushing the placement stage to move vertically along the vertical guide rails to adjust a height of the honeycomb part to be detected, so as to ensure that an upper face of the honeycomb part to be detected is flush with an upper face of the clamp; and a control part of the lifting device 5 is electrically connected to the computer 3;

the clamp 6 is composed of four flat plates and a drive device, is capable of moving close to the honeycomb part to be detected under the action of the drive device, and is then locked by the honeycomb part to be detected, so as to locate and fix the honeycomb part to be detected.

In the case where the digital camera 2 is movably mounted, the system is additionally provided with a walking gantry 7, sliding rails 8 and a moving device 9;

the digital camera 2 is mounted on a beam of the walking gantry 7, and capable of moving laterally along the beam under the drive of the moving devices 9; and the walking gantry 7 is capable of moving longitudinally along the sliding rails 8 under the drive of the moving devices 9, and movements of both the digital camera 2 and the walking gantry 7 are controlled by the computer 3.

The computer 3 includes:

a vertex extraction module, configured to find and record vertexes of cells;

a cell reconstruction module, configured to acquire a reconstructed cell image by connecting the extracted vertexes according to a mapping relationship between the cells and the vertexes; and a quality evaluation module, configured to calculate angular deviation values of all the cells and an average thereof as well as linear deviation values and an average thereof based on the reconstructed cell image, and determine whether the honeycomb structure is qualified or not by comparing with a set tolerance zone.

The computer 3 further includes:

a binarization module, configured to set a pixel value of a background in an image to be 0 and set a pixel value of a honeycomb skeleton in the image to be 1 to form a binary image.

The vertex extraction module includes:

a wall thickness determination unit, configured to set a square window whose side length is changeable from small to large, and, after a window having a certain side length traverses a morphological image, if the minimum value of the number of pixels having pixel values of 0 is non-zero, define the side length of the square window as a wall thickness L;

a pixel assignment unit, configured to set a square assignment window having a side length equal to the wall thickness L, traverse pixel points having pixel values of 1 in the morphological image with the assignment window, and assign a sum of the number of pixels having pixel values of 1 in the window to a pixel point at a center point of the assignment window;

a cell side length unit determination unit, configured to find a pixel point having the maximum assignment after the pixel assignment is completed, establish a square region having an initial side length E equal to the wall thickness L taking the pixel point as a center point, calculate an absolute difference Z between an assignment of each pixel point on each of four boundaries of the region and an assignment of the center point, traverse the whole morphological image, and record the minimum absolute difference Z and coordinates thereof; and establish a new square region with E=E+2 pixels, repeat the process until the minimum absolute difference Z has an obvious reverse increasing trend, and solve a honeycomb cell side length A through coordinates of a pixel point corresponding to the minimum absolute difference Z and coordinates of the center point of the region corresponding to the pixel point; and a pixel annihilation unit, configured to find a pixel point having the maximum assignment, determine and record the pixel point as a vertex, establish a square window to be annihilated with the honeycomb cell side length A as a side length taking the pixel point as a center, clear assignments of all pixel points having pixel values of 1 in the window to be annihilated, further find a pixel point having the maximum assignment among the remaining assignments, determine and record the pixel point as a vertex, and repeat the operation of the window to be annihilated until the assignment of the pixel point having the pixel value of 1 is less than a preset threshold and then the vertex extraction ends.

The vertex extraction module is specifically configured to firstly draw a skeleton plot with lines having pixel values of 1 by adopting line segments having line widths of 1 pixel based on the morphological image; and secondly traverse pixel point 1 to pixel point k based on the skeleton plot with k pixel points, and when encountering a pixel point having a pixel value of 1 each time, acquire a number of pixel value changes by searching around eight neighborhoods of the pixel point clockwise or counterclockwise; if the number of pixel value changes is 4, display that two straight lines exist passing through the pixel point, and when it is known that a reasonable included angle exists between the two straight lines through coordinate calculation, determine and record the pixel point as an edge vertex; and if the number of pixel value changes is 6, display that three straight lines exist passing through the pixel point, and determine and record the pixel point as a middle vertex.

The vertex extraction module is specifically configured to firstly draw a skeleton plot with lines having pixel values of 1 by adopting line segments having line widths of 1 pixel; secondly establish a square window having a size of 5×5 pixels taking a pixel point having a pixel value of 1 as a center point based on the skeleton plot, and if a partial region of the window overflows the skeleton plot, assign pixel values of all pixel points in the overflowing region to 0, calculate a corner response function value R corresponding to the center point of the window with a Harris algorithm, take one percent of the maximum value of the corner response function value R as a limit value, and set a corner response function value R among all corner response function values R in the same window less than the limit value to 0, and repeat the operations to traverse the whole skeleton plot; and thirdly establish a square window having a size of 3×3 pixels taking a pixel point having a pixel value of 1 and a corner response function value R greater than 0 as a center point, and if the R value of the center point of the window is the maximum value in the window, record the center point as a vertex, and repeat the operations to traverse the whole skeleton plot.

The cell reconstruction module is specifically configured to firstly arbitrarily select x vertexes at the central position of the binary image as reference points, find a vertex closest to each of the reference points as an adjacent point, calculate a distance between the reference point and the adjacent point, keep three shortest distance records, and solve an average of distances of 3x records as the cell side length A; secondly classify the acquired vertexes into active connection points and passive connection points, that is, divide the skeleton plot into two regions, namely, an edge region at the periphery of the skeleton plot and having a width of 1 A-2 A, and a central region surrounded by the edge region, the vertexes located in the central region being the active connection points, and the vertexes located in the edge region being the passive connection points; and thirdly connect all the active connection points to the closest three vertexes with line segments, that is, each active connection point essentially and only keeping three shortest line segments, and the reconstructed cell image being formed after the connection is completed.

The cell reconstruction module includes:

an edge expansion unit, configured to form an expanded region by expanding the outermost edge of each of four sides of the morphological image outward by a width of at least 1 pixel based on the morphological image, and acquire an expanded image by setting pixel values of all pixel points in the expanded region to 1; and a vertex connection unit, configured to traverse the expanded image in an order from left to right and from top to bottom taking the expanded image as an object, and when encountering a pixel point having a pixel value of 0, find and record a vertex of the same cell and a connection sequence thereof with a Moore neighborhood tracking algorithm and record the same under the cell, delete duplicate records on a principle that each cell keeps at most six vertexes, and draw a complete cell by connecting the vertexes according to the kept records; then, set pixel values of all pixel points in the cell to 1; and find a next pixel having a pixel value of 1 and repeating the operations until the traverse is completed and the reconstructed cell image is also completed.

A storage medium storing a computer program therein is provided. The computer program, when executed by a processor, causes the processor to execute the steps of the method according to any one of the above embodiments.

An electronic device is provided, including a memory, a display, a processor, and a computer program stored in the memory and running on the processor. The computer program, when executed by the processor, causes the processor to execute the steps of the method according to any one of the above embodiments.

Method Embodiment 1

A method for recognizing a geometric regularity image of a honeycomb structure, includes the steps of: image acquisition, image processing, vertex extraction, cell reconstruction, and quality evaluation, the step of image acquisition including shooting an image and reading the image by a computer; the step of vertex extraction being to find and record vertexes of cells based on the image processing; and the step of cell reconstruction being to acquire a reconstructed cell image by connecting the extracted vertexes according to a mapping relationship between the cells and the vertexes, wherein a step of binaryzation is set between the step of image processing and the step of vertex extraction, and is to set a pixel value of a background in the image to be 0 and set a pixel value of a honeycomb skeleton in the image to be 1 to form a binary image, and the step of quality evaluation is to calculate angular deviation values of all the cells and an average thereof as well as linear deviation values and an average thereof based on the reconstructed cell image, and determine whether the honeycomb structure is qualified or not by comparing with a set tolerance zone.

Method Embodiment 2

This embodiment is basically the same as method embodiment 1, while the difference lies in that the step of vertex extraction is to sequentially perform wall thickness determination, pixel assignment, cell side length determination, and pixel annihilation;

the step of wall thickness determination being to set a square window whose side length is changeable from small to large, and, after a window having a certain side length traverses a morphological image, if the minimum value of the number of pixels having pixel values of 0 is non-zero, define the side length of the square window as a wall thickness L;

the step of pixel assignment being to set a square assignment window having a side length equal to the wall thickness L, traverse pixel points having pixel values of 1 in the morphological image with the assignment window, and assign a sum of the number of pixels having pixel values of 1 in the window to a pixel point at a center point of the assignment window;

the step of cell side length determination being to find a pixel point having the maximum assignment after the pixel assignment is completed, establish a square region having an initial side length E equal to the wall thickness L taking the pixel point as a center point, calculate an absolute difference Z between an assignment of each pixel point on each of four boundaries of the region and an assignment of the center point, traverse the whole morphological image, and record the minimum absolute difference Z and coordinates thereof; and establish a new square region with E=E+2 pixels, repeat the process until the minimum absolute difference Z has an obvious reverse increasing trend, and solve a honeycomb cell side length A through coordinates of a pixel point corresponding to the minimum absolute difference Z and coordinates of the center point of the region corresponding to the pixel point; and the step of pixel annihilation being to find a pixel point having the maximum assignment, determine and record the pixel point as a vertex, establish a square window to be annihilated with the honeycomb cell side length A as a side length taking the pixel point as a center, clear assignments of all pixel points having pixel values of 1 in the window to be annihilated, further find a pixel point having the maximum assignment among the remaining assignments, determine and record the pixel point as a vertex, and repeat the operation of the window to be annihilated until the assignment of the pixel point having the pixel value of 1 is less than a preset threshold and then the vertex extraction ends.

Method Embodiment 3

This embodiment is basically the same as method embodiment 1, while the difference lies in that the step of vertex extraction includes firstly drawing a skeleton plot with lines having pixel values of 1 by adopting line segments having line widths of 1 pixel based on the morphological image; and secondly traversing pixel point 1 to pixel point k based on the skeleton plot with k pixel points, and when encountering a pixel point having a pixel value of 1 each time, and acquiring a number of pixel value changes by searching around eight neighborhoods of the pixel point clockwise or counterclockwise; if the number of pixel value changes is 4, displaying that two straight lines exist passing through the pixel point, and when it is known that a reasonable included angle exists between the two straight lines through coordinate calculation, determining and recording the pixel point as an edge vertex; and if the number of pixel value changes is 6, displaying that three straight lines exist passing through the pixel point, and determining and recording the pixel point as a middle vertex.

Method Embodiment 4

This embodiment is basically the same as method embodiment 1, while the difference lies in that the step of vertex extraction includes firstly drawing a skeleton plot with lines having pixel values of 1 by adopting line segments having line widths of 1 pixel; secondly establishing a square window having a size of 5×5 pixels taking a pixel point having a pixel value of 1 as a center point based on the skeleton plot, and if a partial region of the window overflows the skeleton plot, assigning pixel values of all pixel points in the overflowing region to 0, calculating a corner response function value R corresponding to the center point of the window with a Harris algorithm, taking one percent of the maximum value of the corner response function value R as a limit value, and setting a corner response function value R among all corner response function values R in the same window less than the limit value to 0, and repeating the operations to traverse the whole skeleton plot; and thirdly establishing a square window having a size of 3×3 pixels taking a pixel point having a pixel value of 1 and a corner response function value R greater than 0 as a center point, and if the R value of the center point of the window is the maximum value in the window, recording the center point as a vertex, and repeating the operations to traverse the whole skeleton plot.

Method Embodiments 5-8

These embodiments are basically the same as method embodiments 1-4 respectively, while the difference lies in that the step of cell reconstruction includes firstly arbitrarily selecting x vertexes at the central position of the binary image as reference points, finding a vertex closest to each of the reference points as an adjacent point, calculating a distance between the reference point and the adjacent point, keeping three shortest distance records, and solving an average of distances of 3x records as the cell side length A; secondly classifying the acquired vertexes into active connection points and passive connection points, that is, dividing the skeleton plot into two regions, namely, an edge region at the periphery of the skeleton plot and having a width of 1 A-2 A, and a central region surrounded by the edge region, the vertexes located in the central region being the active connection points, and the vertexes located in the edge region being the passive connection points; and thirdly connecting all the active connection points to the closest three vertexes with line segments, that is, each active connection point essentially and only keeping three shortest line segments, and the reconstructed cell image being formed after the connection is completed Method Embodiments 9-12

These embodiments are basically the same as method embodiments 1-4 respectively, while the difference lies in that the step of cell reconstruction includes edge expansion and vertex connection, the step of edge expansion including forming an expanded region by expanding the outermost edge of each of four sides of the morphological image outward by a width of at least 1 pixel based on the morphological image, and acquiring an expanded image by setting pixel values of all pixel points in the expanded region to 1; the step of vertex connection including traversing the expanded image in an order from left to right and from top to bottom taking the expanded image as an object, and when encountering a pixel point having a pixel value of 0, finding and recording a vertex of the same cell and a connection sequence thereof with a Moore neighborhood tracking algorithm and recording the same under the cell, deleting duplicate records on a principle that each cell keeps at most six vertexes, and drawing a complete cell by connecting the vertexes according to the kept records; then, setting pixel values of all pixel points in the cell to 1; and finding a next pixel having a pixel value of 1 and repeating the operations until the traverse is completed and the reconstructed cell image is also completed System Embodiment 1

A system applicable to the method for recognizing a geometric regularity image of a honeycomb structure includes a detection stage 1, a digital camera 2 and a computer 3, the digital camera 2 being electrically connected to the computer 3; and the number of the digital camera 2 is at least one with a resolution no less than 1080 P, equipped with a telecentric lens, and fixedly mounted and/or movably mounted.

System Embodiment 2

This embodiment is basically the same as system embodiment 1, while the difference lies in that the detection stage 1 is a movable working platform, and includes a placement stage 4, a lifting device 5 and a clamp 6; the lifting device 5 is mounted at the bottom of the placement stage 4; a honeycomb part to be detected is placed on the placement stage 4; the lifting device 5 includes vertical guide rails and an electric or electro-hydraulic push rod, and is capable of pushing the placement stage to move vertically along the vertical guide rails to adjust a height of the honeycomb part to be detected, so as to ensure that an upper face of the honeycomb part to be detected is flush with an upper face of the clamp; and a control part of the lifting device 5 is electrically connected to the computer 3; and the clamp 6 is composed of four flat plates and a drive device, is capable of moving close to the honeycomb part to be detected under the action of the drive device, and is then locked by the honeycomb part to be detected, so as to locate and fix the honeycomb part to be detected.

System Embodiments 3 and 4

These embodiments are basically the same as system embodiments 1-2 respectively, while the difference lies in that in the case where the digital camera 2 is movably mounted, the system is additionally provided with a walking gantry 7, sliding rails 8 and a moving device 9; and the digital camera 2 is mounted on a beam of the walking gantry 7, and capable of moving laterally along the beam under the drive of the moving devices 9; and the walking gantry 7 is capable of moving longitudinally along the sliding rails 8 under the drive of the moving devices 9; and movements of both the digital camera 2 and the walking gantry 7 are controlled by the computer 3.

Vertex extraction and cell reconstruction results of one of the method embodiments of the present invention are shown in FIG. 2. The calculation results are that the maximum internal angle deviation is 14.42, the average internal angle deviation is 2.62, and the standard difference of the internal angle deviation is 2.42, all of which are within a set value range. Thus, it is judged that the product quality is qualified.

What is claimed is:

1. A method for recognizing a geometric regularity image of a honeycomb structure, comprising the steps of image acquisition, image processing, vertex extraction, cell reconstruction, and quality evaluation, the step of image acquisition comprising shooting an image and reading the image by a computer; the step of vertex extraction being to find and record vertexes of cells based on the image processing; and the step of cell reconstruction being to acquire a reconstructed cell image by connecting the extracted vertexes according to a mapping relationship between the cells and the vertexes, wherein a step of binaryzation is set between the step of image processing and the step of vertex extraction, and is to set a pixel value of a background in the image to be 0 and set a pixel value of a honeycomb skeleton in the image to be 1 to form a binary image, and the step of quality evaluation is to calculate angular deviation values of all the cells and an average thereof as well as linear deviation values and an average thereof based on the reconstructed cell image, and determine whether the honeycomb structure is qualified or not by comparing with a set tolerance zone.

2. The method according to claim 1, wherein the step of vertex extraction is to sequentially perform wall thickness determination, pixel assignment, cell side length determination, and pixel annihilation, the step of wall thickness determination being to set a square window whose side length is changeable from small to large, and, after a window having a certain side length traverses a morphological image, if the minimum value of the number of pixels having pixel values of 0 is non-zero, define the side length of the square window as a wall thickness L;

the step of pixel assignment being to set a square assignment window having a side length equal to the wall thickness L, traverse pixel points having pixel values of 1 in the morphological image with the assignment window, and assign a sum of the number of pixels having pixel values of 1 in the window to a pixel point at a center point of the assignment window;

the step of cell side length determination being to find a pixel point having the maximum assignment after the pixel assignment is completed, establish a square region having an initial side length E equal to the wall thickness L taking the pixel point as a center point, calculate an absolute difference Z between an assignment of each pixel point on each of four boundaries of the region and an assignment of the center point, traverse the whole morphological image, and record the minimum absolute difference Z and coordinates thereof; and establish a new square region with E=E+2 pixels, repeat the process until the minimum absolute difference Z has an obvious reverse increasing trend, and solve a honeycomb cell side length A through coordinates of a pixel point corresponding to the minimum absolute difference Z and coordinates of the center point of the region corresponding to the pixel point; and the step of pixel annihilation being to find a pixel point having the maximum assignment, determine and record the pixel point as a vertex, establish a square window to be annihilated with the honeycomb cell side length A as a side length taking the pixel point as a center, clear assignments of all pixel points having pixel values of 1 in the window to be annihilated, further find a pixel point having the maximum assignment among the remaining assignments, determine and record the pixel point as a vertex, and repeat the operation of the window to be annihilated until the assignment of the pixel point having the pixel value of 1 is less than a preset threshold and then the vertex extraction ends.

3. The method according to claim 2, wherein the step of cell reconstruction comprises firstly arbitrarily selecting x vertexes at the central position of the binary image as reference points, finding a vertex closest to each of the reference points as an adjacent point, calculating a distance between the reference point and the adjacent point, keeping three shortest distance records, and solving an average of distances of 3× records as the cell side length A; secondly classifying the acquired vertexes into active connection points and passive connection points, that is, dividing the skeleton plot into two regions, namely, an edge region at the periphery of the skeleton plot and having a width of 1 A-2 A, and a central region surrounded by the edge region, the vertexes located in the central region being the active connection points, and the vertexes located in the edge region being the passive connection points; and thirdly connecting all the active connection points to the closest three vertexes with line segments, that is, each active connection point essentially and only keeping three shortest line segments, and the reconstructed cell image being formed after the connection is completed.

4. The method according to claim 2, wherein the step of cell reconstruction comprises edge expansion and vertex connection, the step of edge expansion comprising forming an expanded region by expanding the outermost edge of each of four sides of the morphological image outward by a width of at least 1 pixel based on the morphological image, and acquiring an expanded image by setting pixel values of all pixel points in the expanded region to 1; the step of vertex connection comprising traversing the expanded image in an order from left to right and from top to bottom taking the expanded image as an object, and when encountering a pixel point having a pixel value of 0, finding and recording a vertex of the same cell and a connection sequence thereof with a Moore neighborhood tracking algorithm and recording the same under the cell, deleting duplicate records on a principle that each cell keeps at most six vertexes, and drawing a complete cell by connecting the vertexes according to the kept records; then, setting pixel values of all pixel points in the cell to 1; and finding a next pixel having a pixel value of 1 and repeating the operations until the traverse is completed and the reconstructed cell image is also completed.

5. A system applicable to the method according to claim 2, comprising a detection stage (1), a digital camera (2) and a computer (3), the digital camera (2) being electrically connected to the computer (3), wherein the number of the digital camera (2) is at least one with a resolution no less than 1080 P, equipped with a telecentric lens, and being fixedly mounted and/or movably mounted.

6. The method according to claim 1, wherein the step of vertex extraction is to sequentially perform the following steps:

acquiring a smooth honeycomb vertex image by performing closed operation processing on the binary image; and acquiring the vertex of the honeycomb cell by taking a center of a largest circle on a honeycomb wall of the smooth honeycomb vertex image.

7. The method according to claim 6, wherein the step of cell reconstruction comprises firstly arbitrarily selecting x vertexes at the central position of the binary image as reference points, finding a vertex closest to each of the reference points as an adjacent point, calculating a distance between the reference point and the adjacent point, keeping three shortest distance records, and solving an average of distances of 3× records as the cell side length A; secondly classifying the acquired vertexes into active connection points and passive connection points, that is, dividing the skeleton plot into two regions, namely, an edge region at the periphery of the skeleton plot and having a width of 1 A-2 A, and a central region surrounded by the edge region, the vertexes located in the central region being the active connection points, and the vertexes located in the edge region being the passive connection points; and thirdly connecting all the active connection points to the closest three vertexes with line segments, that is, each active connection point essentially and only keeping three shortest line segments, and the reconstructed cell image being formed after the connection is completed.

8. The method according to claim 6, wherein the step of cell reconstruction comprises edge expansion and vertex connection, the step of edge expansion comprising forming an expanded region by expanding the outermost edge of each of four sides of the morphological image outward by a width of at least 1 pixel based on the morphological image, and acquiring an expanded image by setting pixel values of all pixel points in the expanded region to 1; the step of vertex connection comprising traversing the expanded image in an order from left to right and from top to bottom taking the expanded image as an object, and when encountering a pixel point having a pixel value of 0, finding and recording a vertex of the same cell and a connection sequence thereof with a Moore neighborhood tracking algorithm and recording the same under the cell, deleting duplicate records on a principle that each cell keeps at most six vertexes, and drawing a complete cell by connecting the vertexes according to the kept records; then, setting pixel values of all pixel points in the cell to 1; and finding a next pixel having a pixel value of 1 and repeating the operations until the traverse is completed and the reconstructed cell image is also completed.

9. A system applicable to the method according to claim 6, comprising a detection stage (1), a digital camera (2) and a computer (3), the digital camera (2) being electrically connected to the computer (3), wherein the number of the digital camera (2) is at least one with a resolution no less than 1080 P, equipped with a telecentric lens, and being fixedly mounted and/or movably mounted.

10. The method according to claim 1, wherein the step of vertex extraction comprises firstly drawing a skeleton plot with lines having pixel values of 1 by adopting line segments having line widths of 1 pixel; secondly establishing a square window having a size of 5×5 pixels taking a pixel point having a pixel value of 1 as a center point based on the skeleton plot, and if a partial region of the window overflows the skeleton plot, assigning pixel values of all pixel points in the overflowing region to 0, calculating a corner response function value R corresponding to the center point of the window with a Harris algorithm, taking one percent of the maximum value of the corner response function value R as a limit value, and setting a corner response function value R among all corner response function values R in the same window less than the limit value to 0, and repeating the operations to traverse the whole skeleton plot; and thirdly establishing a square window having a size of 3×3 pixels taking a pixel point having a pixel value of 1 and a corner response function value R greater than 0 as a center point, and if the R value of the center point of the window is the maximum value in the window, recording the center point as a vertex, and repeating the operations to traverse the whole skeleton plot.

11. The method according to claim 10, wherein the step of cell reconstruction comprises firstly arbitrarily selecting x vertexes at the central position of the binary image as reference points, finding a vertex closest to each of the reference points as an adjacent point, calculating a distance between the reference point and the adjacent point, keeping three shortest distance records, and solving an average of distances of 3x records as the cell side length A; secondly classifying the acquired vertexes into active connection points and passive connection points, that is, dividing the skeleton plot into two regions, namely, an edge region at the periphery of the skeleton plot and having a width of 1 A-2 A, and a central region surrounded by the edge region, the vertexes located in the central region being the active connection points, and the vertexes located in the edge region being the passive connection points; and thirdly connecting all the active connection points to the closest three vertexes with line segments, that is, each active connection point essentially and only keeping three shortest line segments, and the reconstructed cell image being formed after the connection is completed.

12. The method according to claim 10, wherein the step of cell reconstruction comprises edge expansion and vertex connection, the step of edge expansion comprising forming an expanded region by expanding the outermost edge of each of four sides of the morphological image outward by a width of at least 1 pixel based on the morphological image, and acquiring an expanded image by setting pixel values of all pixel points in the expanded region to 1; the step of vertex connection comprising traversing the expanded image in an order from left to right and from top to bottom taking the expanded image as an object, and when encountering a pixel point having a pixel value of 0, finding and recording a vertex of the same cell and a connection sequence thereof with a Moore neighborhood tracking algorithm and recording the same under the cell, deleting duplicate records on a principle that each cell keeps at most six vertexes, and drawing a complete cell by connecting the vertexes according to the kept records; then, setting pixel values of all pixel points in the cell to 1; and finding a next pixel having a pixel value of 1 and repeating the operations until the traverse is completed and the reconstructed cell image is also completed.

13. A system applicable to the method according to claim 10, comprising a detection stage (1), a digital camera (2) and a computer (3), the digital camera (2) being electrically connected to the computer (3), wherein
the number of the digital camera (2) is at least one with a resolution no less than 1080 P, equipped with a telecentric lens, and being fixedly mounted and/or movably mounted.

14. The method according to claim 1, wherein the step of cell reconstruction comprises firstly arbitrarily selecting x vertexes at the central position of the binary image as reference points, finding a vertex closest to each of the reference points as an adjacent point, calculating a distance between the reference point and the adjacent point, keeping three shortest distance records, and solving an average of distances of 3× records as the cell side length A; secondly classifying the acquired vertexes into active connection points and passive connection points, that is, dividing the skeleton plot into two regions, namely, an edge region at the periphery of the skeleton plot and having a width of 1 A-2 A, and a central region surrounded by the edge region, the vertexes located in the central region being the active connection points, and the vertexes located in the edge region being the passive connection points; and thirdly connecting all the active connection points to the closest three vertexes with line segments, that is, each active connection point essentially and only keeping three shortest line segments, and the reconstructed cell image being formed after the connection is completed.

15. The method according to claim 1, wherein the step of cell reconstruction comprises edge expansion and vertex connection, the step of edge expansion comprising forming an expanded region by expanding the outermost edge of each of four sides of the morphological image outward by a width of at least 1 pixel based on the morphological image, and acquiring an expanded image by setting pixel values of all pixel points in the expanded region to 1; the step of vertex connection comprising traversing the expanded image in an order from left to right and from top to bottom taking the expanded image as an object, and when encountering a pixel point having a pixel value of 0, finding and recording a vertex of the same cell and a connection sequence thereof with a Moore neighborhood tracking algorithm and recording the same under the cell, deleting duplicate records on a principle that each cell keeps at most six vertexes, and drawing a complete cell by connecting the vertexes according to the kept records; then, setting pixel values of all pixel points in the cell to 1; and finding a next pixel having a pixel value of 1 and repeating the operations until the traverse is completed and the reconstructed cell image is also completed.

16. A system applicable to the method according to claim 1, comprising a detection stage (1), a digital camera (2) and a computer (3), the digital camera (2) being electrically connected to the computer (3), wherein
the number of the digital camera (2) is at least one with a resolution no less than 1080 P, equipped with a telecentric lens, and being fixedly mounted and/or movably mounted.

17. The system according to claim 16, wherein the detection stage (1) is a movable working platform, and comprises a placement stage (4), a lifting device (5) and a clamp (6), the lifting device (5) being mounted at the bottom of the placement stage (4); a honeycomb part to be detected being placed on the placement stage (4); the lifting device (5) comprising vertical guide rails and an electric or electrohydraulic push rod capable of pushing the placement stage (4) to move vertically along the vertical guide rails to adjust a height of the honeycomb part to be detected, so as to ensure that an upper face of the honeycomb part to be detected is flush with an upper face of the clamp (6); and a control part of the lifting device (5) being electrically connected to the computer (3); and the clamp (6) being composed of four flat plates and a drive device, capable of moving close to the honeycomb part to be detected under the action of the drive device and then being locked by the honeycomb part to be detected, so as to locate and fix the honeycomb part to be detected.

18. The system according to claim 16, wherein in the case where the digital camera (2) is movably mounted, the system is additionally provided with a walking gantry (7), sliding rails (8) and a moving device (9);

the digital camera (2) is mounted on a beam of the walking gantry (7), and is capable of moving laterally along the beam under the drive of the moving device (9); and the walking gantry (7) is capable of moving longitudinally along the sliding rails (8) under the drive of the moving device (9), and movements of both the digital camera (2) and the walking gantry (7) are controlled by the computer (3).

19. A non-transitory computer readable storage medium storing a computer program therein, wherein the computer program, when executed by a processor, causes the processor to execute the steps of the method according to claim 1.

20. An electronic device, comprising a memory, a display, a processor, and a computer program stored in the memory and running on the processor, wherein the computer program, when executed by the processor, causes the processor to execute the steps of the method according to claim 1.

\* \* \* \* \*